United States Patent
Ross

(12) 
(10) Patent No.: US 6,354,692 B1
(45) Date of Patent: Mar. 12, 2002

(54) METHOD AND APPARATUS FOR MINIMIZING COLOR HUE SHIFTS IN BI-DIRECTIONAL INKJET PRINTING

(75) Inventor: George C. Ross, Philomath, OR (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/303,249

(22) Filed: Apr. 30, 1999

(51) Int. Cl.[7] .................................................. B41J 2/15
(52) U.S. Cl. ......................................... 347/41; 347/43
(58) Field of Search ............................ 347/40, 41, 43, 347/5, 12, 15; 358/1.13, 502

(56) References Cited

U.S. PATENT DOCUMENTS

| | | | |
|---|---|---|---|
| 4,855,752 A | * 8/1989 | Bergstedt | 347/41 |
| 4,908,638 A | * 3/1990 | Albosta et al. | 347/43 |
| 4,978,971 A | * 12/1990 | Goet | 347/5 |
| 4,999,656 A | 3/1991 | Trask | 347/43 |
| 5,442,385 A | * 8/1995 | Moon et al. | 347/43 |
| 5,555,006 A | 9/1996 | Cleveland et al. | 347/41 |
| 5,680,519 A | 10/1997 | Neff | 395/109 |
| 5,704,021 A | 12/1997 | Smith et al. | 395/109 |
| 5,923,349 A | * 7/1999 | Meyer | 347/43 |

FOREIGN PATENT DOCUMENTS

| | | | |
|---|---|---|---|
| EP | 0630750 A2 | 12/1994 | B41J/2/05 |
| EP | 0665676 A2 | 8/1995 | H04N/1/60 |
| EP | 0737001 A2 | 10/1996 | H04N/1/60 |

OTHER PUBLICATIONS

Communication From our foreign agents (Carpmaels & Ransford) with European Search Report Attached. 3 pages.; Dated Feb. 14, 2001.

Charles A. Paynton, "Frequently Asked Questions about Colour", Mar. 2, 1997, 24 pages.

* cited by examiner

Primary Examiner—N. Le
Assistant Examiner—Lamson D. Nguyen

(57) ABSTRACT

The present invention is a single-pass, bi-directional printer where two color maps are being employed. One color map is used for left to right printing and the second color map is used for printing right to left. The use of two color maps allows the quantity and placement of individual ink droplets to be adjusted, according to their order of application, to minimize the directional related color hue shift typically experienced with bi-directional inkjet printers.

16 Claims, 5 Drawing Sheets

METHOD AND APPARATUS FOR MINIMIZING COLOR HUE SHIFTS IN BI-DIRECTIONAL INKJET PRINTING

CROSS REFERENCE TO RELATED APPLICATIONS

The present disclosure may contain subject matter related to U.S. patent application Ser. No. 09/302,860, filed Apr. 30, 1999, entitled "Method and Apparatus for Minimizing Color Hue Shifts in Single-Pass, Bi-Directional Inkjet Printings".

FIELD OF THE INVENTION

This invention relates to color printing, and more particularly to minimizing color hue shift in bidirectional color inkjet printing.

BACKGROUND OF THE INVENTION

The art of inkjet printing technology is relatively well developed. Commercial products such as computer printers, graphics plotters, copiers, and facsimile machines employ inkjet technology for producing hard copy printed output. The basics of this technology are disclosed, for example, in various articles in the Hewlett-Packard Journal, Vol. 36, No. 5 (May 1985), Vol. 39, No. 4 (August 1988) Vol. 39, No. 5 (October 1988), Vol. 43, No. 4 (August 1992), Vol. 43, No. 6 (December 1992) and Vol. 45 No. 1 (February 1994) editions. Inkjet devices are also described by W. J. Lloyd and H. T. Taub in Output Hardcopy Devices, chapter 13 (Ed. R. C. Durbeck and S. Sherr, Academic Press, San Diego, 1988).

With the increased popularity of inkjet printing comes the increased competition between manufacturers of inkjet printers. Currently, the most common distinguishing features between competitive inkjet printers are price, speed, and print quality. Today, most inkjet printer manufacturers sell a model of printer in each price range of inkjet printers ranging from low cost home and office printers to high-speed commercial printers. To be competitive within each price range, the printer manufacturer must supply a printer with a faster print speed and a better resultant print quality than his competitors'. With price at a consistent low among the competitive inkjet printer manufacturers, a fast print speed directly coupled to a superior resultant print quality is key to the consumer's selection.

In the inkjet printing systems of today, color is mapped between that viewed on the monitor or display in a RGB (Red, Green, Blue) format to that outputted on an inkjet printer in a CMY (Cyan, Magenta, Yellow) format. This color mapping is necessary to obtain the "true" colors the user expects based on the display of color on the monitor as the mixing of the three colors are different between RGB and CMY schemes. U.S. Pat. No. 5,704,021 to Smith et al., assigned to the same Assignee as the present invention, discloses the process of "color mapping" in color inkjet printers.

Color mapping provides the printer driver with the combination and amount of color ink droplets to be applied to the outlet to get the requested color. However, due to the fixed order of the color print cartridges in the printer, the order in which the ink droplets are to be applied is fixed. For example, in an inkjet printer where the print cartridges are ordered from left to right, a combination of Cyan and Yellow will have to be ordered Yellow then Cyan. In the event the inkjet printer works in a bi-directional mode, when returning in the right to left direction, a combination of Cyan and Yellow will have to be ordered Cyan then Yellow. This typically creates a varying color between left to right passes and right to left passes of the print cartridges. This variation may produce an undesirable banding effect to the output.

The fastest way to print a contiguous area of color with a scanning inkjet printhead is to sweep the printhead across the media in a first direction while firing ink droplets as prescribed by the color map from an array of nozzles, advance the media the height of the array of nozzles then sweep the printhead in a second, opposite direction firing ink droplets as before. This is known as single-pass, bi-directional printing. Single-pass because the printhead passes over each area of the page only one time. There is minimal or no overlap between adjacent printed rows. Bi-directional because drops are fired while the printhead is travelling in both the left to right direction and the returning right to left direction.

This technique is well known and successful for printing in monochrome. Workers skilled in this field have recognized, however, that for printing in color a hue shift, or more precisely a color hue shift, arises between printing left to right over right to left.

One solution to this problem has been to digress to single-pass unidirectional printing In this case, everything is printed in a left to right order, thereby eliminating the directional related color hue shifts. A second solution to the problem is to resort to multi-pass bi-directional printing where the colors arc overlayed in an averaging or blending scheme whereby the banding becomes less noticeable. Either of these two solutions compromise print speed to achieve highest print quality.

A third solution is proposed in the aforementioned concurrently filed application, titled "A Method for Minimizing Hue Shifts in Single-Pass, Bi-Directional Color Inkjet Printing," in the name of Ross et al.

In the competitive inkjet market of today where the users command faster, smaller, less expensive, high quality inkjet printing, the addition of two print cartridges both increases the cost of manufacture as well as the size of the printer enclosure necessary to house these additional print cartridges.

With the increasing use of inkjet printers for high quality color printing in the home and in the office, there is a need for a high speed, low cost, compact inkjet printer that produces a uniform high quality output.

SUMMARY OF THE INVENTION

A single-pass printer prints in a first direction and a second direction on a print medium. The second direction is opposite the first direction. The printer has a first color map and a second color map. The printer has a print mode which employs the first color map while depositing a first swath of ink droplets onto the print medium in the first direction, and employs the second color map while depositing a second swath of ink droplets, adjacent to the first swath of ink droplets, onto the print medium in the second direction.

DETAILED DESCRIPTION OF A PREFERRED EMBODIMENT

The preferred embodiment of the inkjet printer of the present invention, as is about to be described, prints bi-directionally, so there is no time wasted on a carriage return; prints in a single-pass mode, so there is no time wasted on overlapping printing; and the deposition of ink droplets to form composite colors is as prescribed by two directionally dependent color maps, that compensate for the change of direction in a way that minimizes the visual color hue shift.

Figure 1:
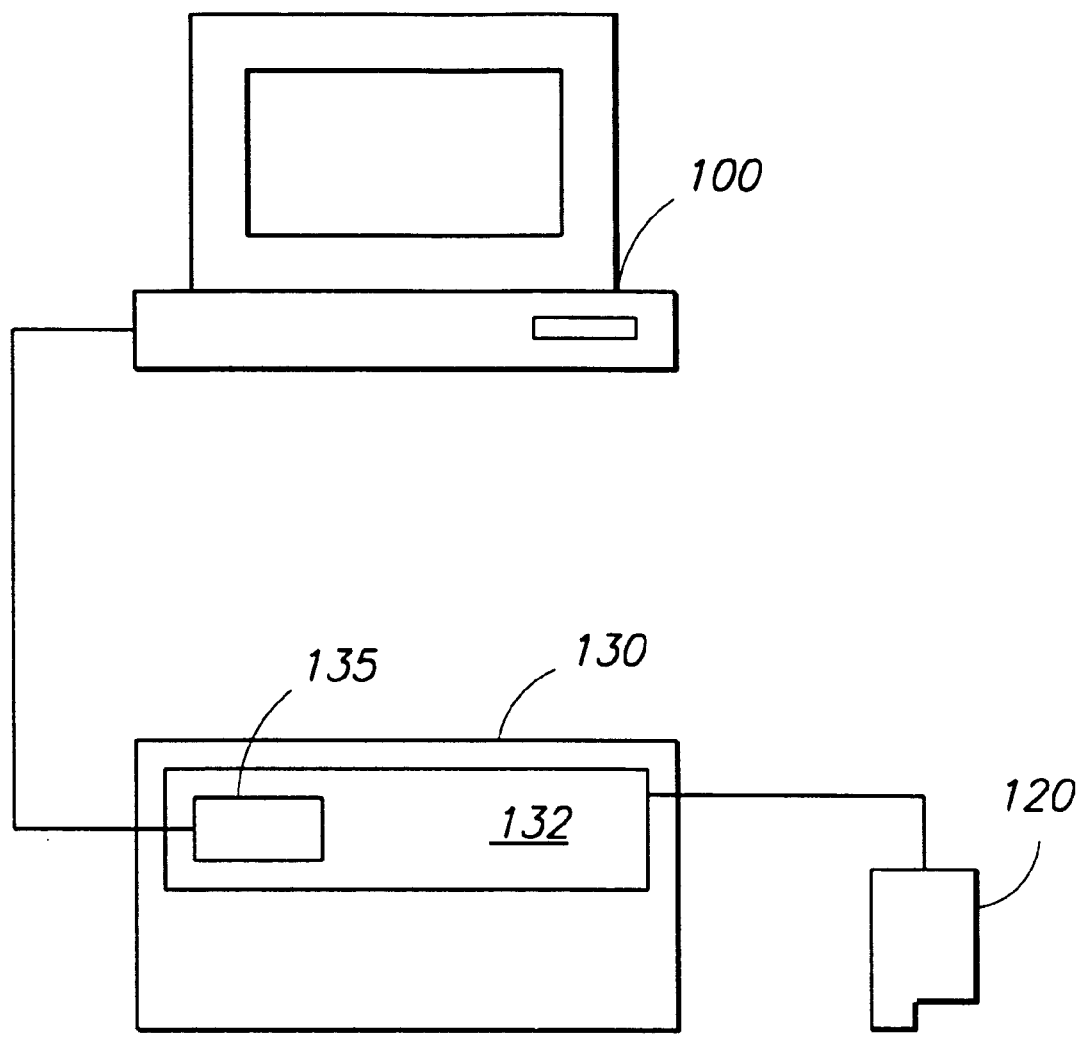
FIG. 1 is a computer controlled inkjet printing system in the preferred embodiment of the invention.

FIG. 1 is a computer 100 controlled inkjet printing system in the preferred embodiment of the invention. The computer 100 is shown connected to an inkjet printer 130. The inkjet printer 130 has a printer controller 132 that receives print commands from the computer 100. There is a printer memory 135 that supplies stored printing instructions, such as the method of selecting a print mode, to the printer controller 132. Printing is accomplished by traversing a printhead carriage (not shown) from side to side across the media while expulsing droplets of ink from the printheads 120.

Figure 2A:
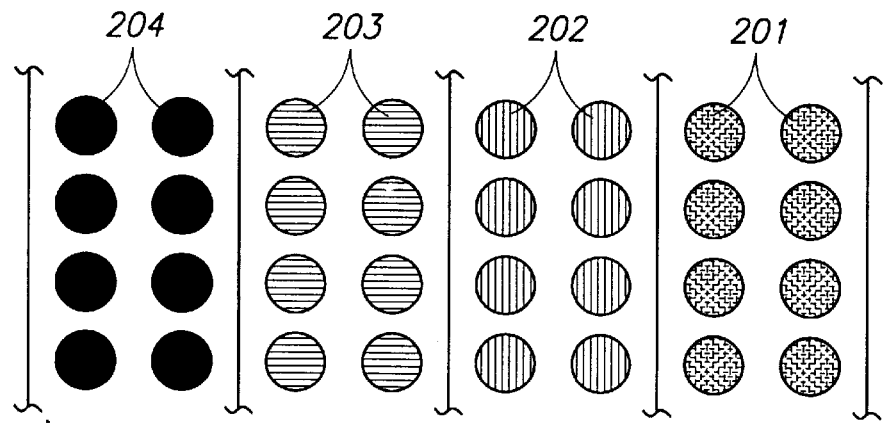
FIG. 2 depicts a four-nozzle high section across a width of four inkjet printheads illustrating the arrangement and colors of ink droplets emerging from the rows of nozzles of each inkjet printhead.
FIG. 2B depicts composite ink dots deposited on a portion of media in a left to right pass and a portion of media with composite dots deposited in a right to left pass of overlaid ink droplets created with the nozzle row configuration illustrated in FIG. 2A.

FIG. 2A depicts a four-nozzle high section across a width of four inkjet printheads 120 illustrating the arrangement and colors of ink droplets emerging from the rows of nozzles of each inkjet printhead 120. FIG. 2A illustrates the arrangement and colors of ink droplets emerging from rows of ink expulsion nozzles (not shown) disposed on each inkjet printhead 120 with the colors ordered, as indicated by the shading, in ink expulsion nozzles rows from left to right as BBCCMMYY (Black, Cyan, Magenta, Yellow). In this example, each color has two rows of nozzles.

Figure 2B:
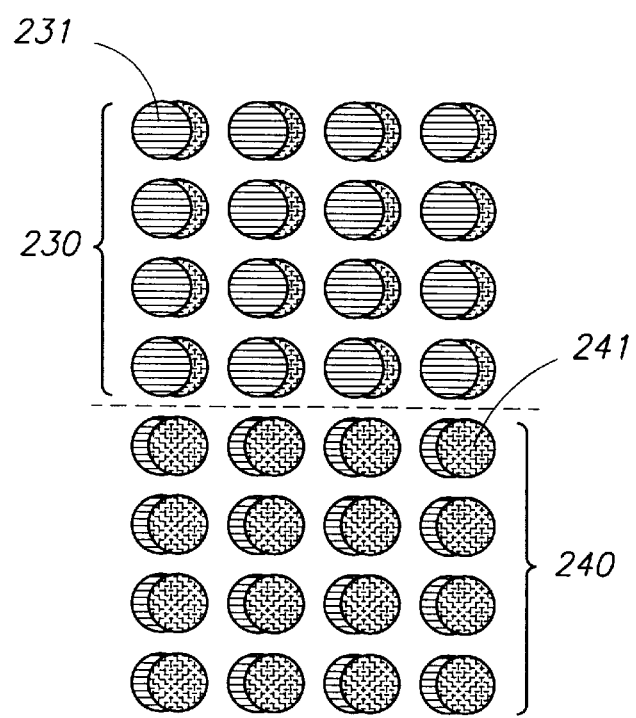

FIG. 2B depicts a matrix of composite ink dots 231 deposited on a portion of media from a left to right pass 230 of the inkjet printhead 120 and a second matrix of composite ink dots 241 deposited on a portion of media from a right to left pass 240 of overlaid ink droplets created with the nozzle row configuration illustrated in FIG. 2A. In this example, on the left to right pass 230, a shade of green is created by the combining of a droplet of Yellow ink from one of the two rows of a first ink color droplets 201 and a droplet of Cyan ink from one of the two rows of a second ink color droplets 203. An overlapping of droplets of Cyan ink with droplets of Yellow ink create the four by four matrix of first composite color "greenish hue" dots 231 as shown by area 230. Due to the left to right traverse of the printhead carriage (not shown) and the physical BBCCMMYY ordering of inkjet printheads 120, as shown in FIG. 2A, the first ink color droplets 201 (Yellow) must be dispensed first with the second ink color droplets 203 (Cyan) being dispensed second.

When the inkjet printer 100 is printing in a single-pass, bidirectional mode, and after the inkjet printer 100 prints across the media from left to right, the printer 100 then indexes the print media, and prints the next swath of printing while the printhead carriage (not shown) is traversing right to left. For the example shown in FIG. 2B, this results in the four by four matrix of second composite color "greenish hue" ink dots 241 shown in FIG. 2B as right to left pass 240. Reversing the movement of the printhead carriage, reverses the order of the inkjet printheads 120 and, as a result, the second ink color droplets 203 (Cyan) will be dispensed before the first ink color droplets 201 (Yellow).

The difference between the first composite color greenish hue ink dots 231 applied in the left to right pass 230 of the inkjet printer 100 and the second composite color greenish hue ink dots 241 which are attempting to create the same color hue in a right to left pass 240, creates a visible "banding" effect or a color hue shift between adjacent swaths of printing. This banding varies depending on the combinations of primary colors required, but can be very noticeable as a typical swath of inkjet printing is approximately 0.30 to 1.00 inches ,or 7.62 to 25.40 mm, high.

Another inkjet printer has all three colors (Cyan, Yellow, and Magenta) contained in the same print cartridge, with the rows of nozzles in parallel, and located together in one six-row ink expulsion region on one single flexible inkjet printhead circuit (not shown). An example of a commercially available three color inkjet print cartridge is a Hewlett-Packard Model C1823A. The black print cartridge, however, is a separate print cartridge, typically placed to the left of the three-color cartridge. In this printer, the ink in the three-color cartridge is channeled to the particular nozzle row from the corresponding primary ink container thereby maintaining the CCMMYY color ordering. Therefore, deposition of ink droplets is similar to the described method of FIG. 2A and FIG. 2B above.

Single-pass printing, as used herein, means depositing a swath of ink droplets across a medium as the ink expelling printhead is moved relative to the medium. The medium is incremented a distance approximately equal to the printed swath and the printhead is again traversed across the medium expelling ink droplets in another swath on the medium. The printed swaths are arranged adjacent each other such that no meaningful overlap of deposited droplets occurs between the swaths. Bi-directional printing means that the ink expelling printhead deposits ink droplets in both left to right and right to left traversals of the medium. It is a feature of the invention that there are two color maps being employed. One color map is used for left to right printing and the second color map is used for printing right to left. The use of two color maps allows the quantity and placement of individual ink droplets to be adjusted, according to their order of application, to minimize the directional related color hue shift.

Figure 3:
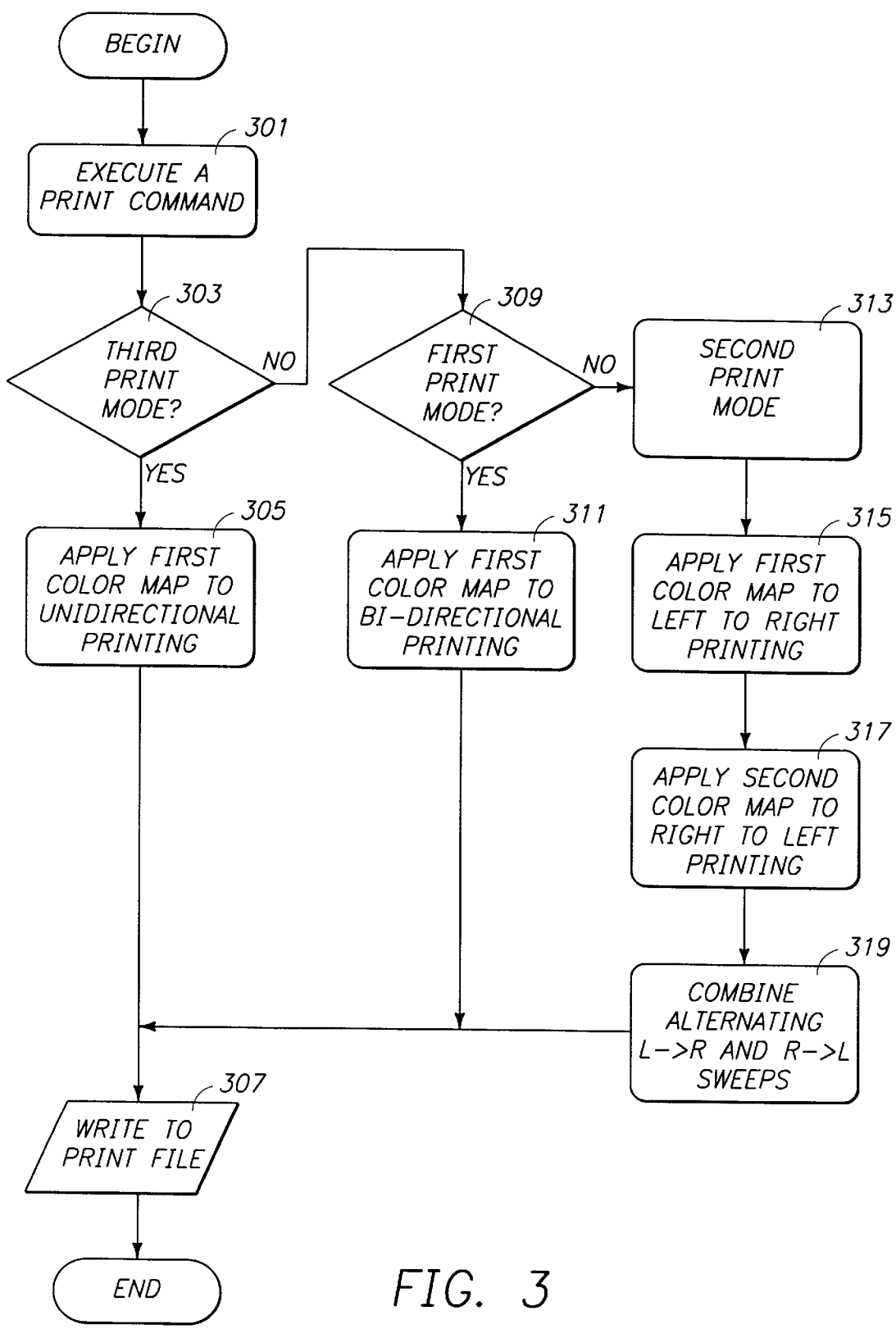
FIG. 3 is a representation of the flowchart of the method of selecting a print mode that will invoke a bi-directional color mapping scheme in an inkjet printer of the preferred embodiment of the present invention.

FIG. 3 is a representation of the flowchart of the method of selecting a print mode that will invoke a bidirectional color mapping scheme in an inkjet printer 130 utilizing a preferred embodiment of the present invention. With the inkjet printer 130 (FIG. 1) connected to the computer 100, the inkjet printer 130 is waiting for a print command to be issued from the printer controller 132.

In the preferred embodiment of the invention, upon execution of a print command by the user, the computer 100 queries the user for the print quality desired. These different print modes are commonly referred to as "draft"—lowest print quality, but highest print speed; "normal"—optimal print quality at optimal speed; and "best"—highest quality printing, but typically at the lowest print speed. In the flow chart of FIG. 3, first print mode corresponds to a typical "draft" mode; second print mode corresponds to a typical "normal" print mode; and, third print mode corresponds to a "best" print mode.

In FIG. 3, when the user executes a print command, block 301, the user will make a selection of the third print mode (block 303), the first print mode (block 309), or accept the second print mode (block 313), which is a "default" or normal print mode. If the third print mode (block 303) is selected, the printer controller 132 of the printer 130 will select the instruction set contained in a printer memory 135 that prints in a unidirectional printing mode. Uni-directional printing prints in one direction, with no printing taking place during the return of the printhead carriage (not shown). In unidirectional printing, the printer controller 132 applies the first color map to all printing, as indicated in block 305. The first color map is designed primarily for printing in a first direction which is typically a left to right traverse across the media. Color maps work as a reference or a "recipe" for creating a multitude of colors from the overlaying of ink droplets of primary inkjet ink colors (Cyan, Magenta, Yellow) thereby creating composite dots of varying color hues.

As the third print mode (block 303) is equated to a "best" print mode, the printer controller 132 will apply the first color map to unidirectional printing (block 305). Unidirectional printing enables all colors to be constructed from a like order and quantity of inks. This allows for a more consistent color hue throughout the document. This consistency minimizes the color hue shift from print swath to adjacent print swath. The printer controller 132 moves the color mapped data to the print file (block 307), and the printing commences. Although the quality of the printing is high, speed is compromised as no printing takes place on the return of the printer carriage.

In the case where the first print mode (Block 309) is selected ("draft mode"), the printer controller 132 will apply the first color map to bi-directional printing as indicated by block 311. For this case, the printer 130 is printing bi-directionally, and the printer 132 applies the first color map to both left to right and right to left printing. As described previously, this is the typical method of printing in inkjet printers and tends to create a visual color hue shift between adjacent swaths of printing. The printer controller 132 moves the color mapped data to the print file (block 307) and the printing commences.

If neither the third print mode (block 303) nor the first print mode (block 309) is selected, the second print mode 313 is assumed. The printer controller 132 divides the commanded print job into left to right printing and right to left printing in alternating sweeps of printing. A first color map (stored in printer memory 135) is applied (block 315) to left to right printing, then a second color map (also stored in printer memory 135) is applied (block 317) to right to left printing. Next, the print job is recombined by printer controller 132 in block 319 alternating left to right and right to left sweeps of the printhead operation. And, finally, printer controller 132 moves the color mapped data to the print file (block 307) and the printing commences.

By dividing the printing job into left to right and right to left sweeps, applying the appropriate color maps, then recombining the printing job the processing of the print job is slowed slightly. However, the additional processing time required is not as noticeable as the slower printing experienced with unidirectional printing where the system waits for the mechanical return of the printer carriage to print the next swath.

The next four figures are stacked area charts showing the difference from a left to right printed swath and an adjacent right to left printed swath. Each chart shows a comparison of three color defining parameters that are typical measurements in color printing evaluations. The first of these parameters is the difference in color "hue" which is the difference in "perceived color." The second parameter is the difference in "chroma" which is the difference in "strong versus weak color." And the third parameter is difference in "luminance" which is the difference in "light versus dark color." A detailed explanation of these color parameters is disclosed in an article by Charles A. Poynton. *Frequently Asked Questions about Color*. Copyright 02 March 1999. Available: www.inforamp.net/~poynton. Apr. 29, 1999.

Figure 4A:
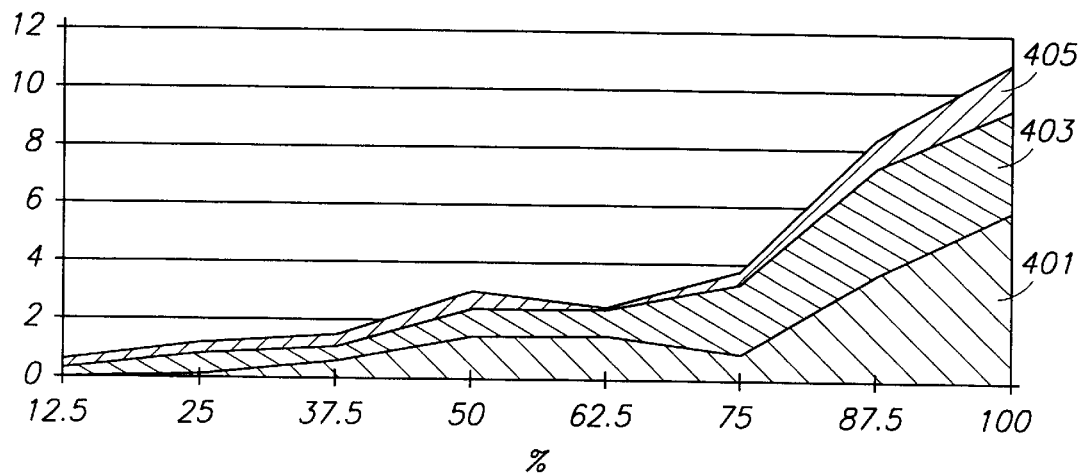
FIG. 4A is a chart of color variation parameters with respect to grey tones utilizing one color map in a single-pass, bi-directional print mode.

FIG. 4A is a stacked area chart of color variation parameters with respect to grey tones utilizing one color map in single-pass, bidirectional printing. In this example, the same color map is used in both the left to right and the right to left directions. The x-axis denotes the level of grey in the sampled area with 100% gray being solid black. Area 401 is the measured difference in "hue" between left to right printed swaths and adjacent right to left printed swaths. Area 403 is the difference in "chroma" and area 405 is the difference in "luminance."

Figure 4B:
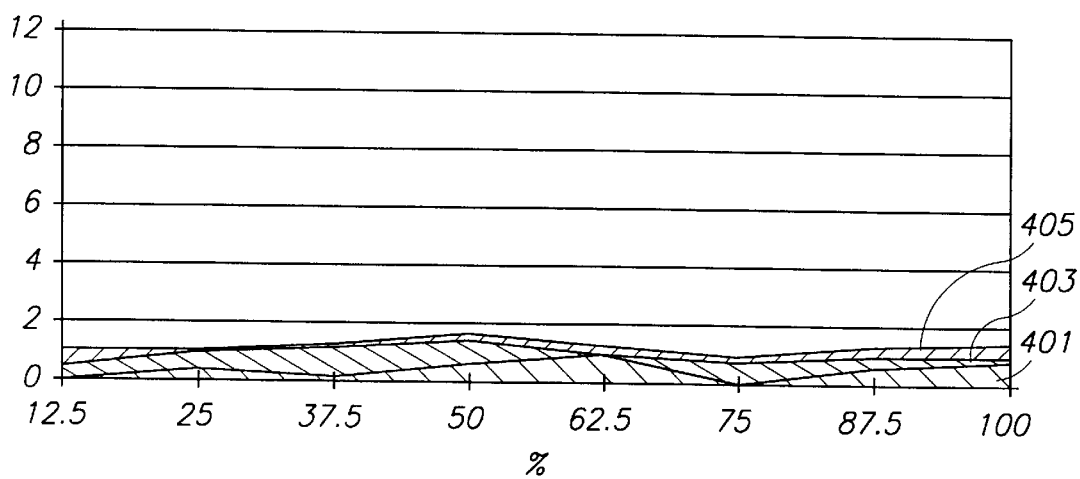
FIG. 4B is a chart of color variation parameters with respect to grey tones utilizing two color maps in a single-pass, bidirectional print mode as implemented in the preferred embodiment of the present invention.

Printing the same sample as in FIG. 4A, but implementing the second color map as disclosed in the preferred embodiment of the present invention, FIG. 4B is an exemplary demonstration of the desired results. All three parameters, hue, chroma, and luminance exhibit minimal changes between left to right and adjacent right to left swaths of printing as compared to the differences illustrated in FIG. 4A.

Figure 5A:
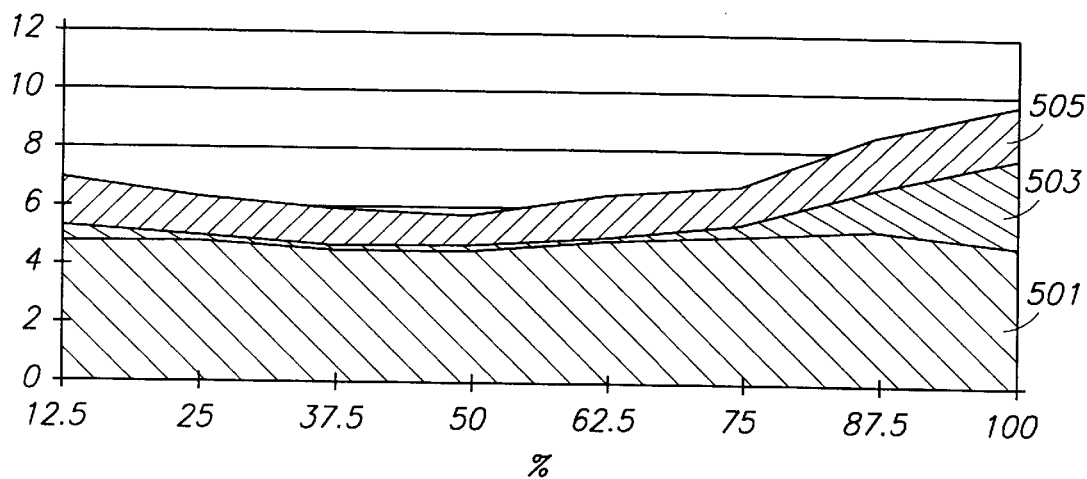
FIG. 5A is a chart of color variation parameters with respect to red tones utilizing one color map in a single-pass, bi-directional print mode.

FIG. 5A is a stacked area chart of color variation parameters with respect to red tones utilizing one color map in single-pass, bi-directional printing. In this case, the x-axis denotes the level of red in the sampled area with 100% red being the darkest red. Area 501 is the difference in hue, area 503 is the difference in chroma, and area 505 is the difference in luminance.

Figure 5B:
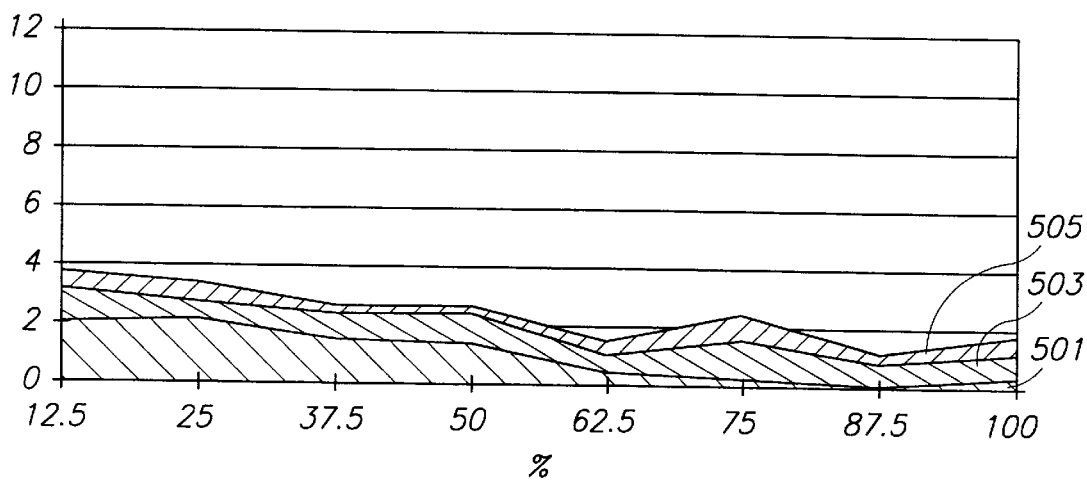
FIG. 5B is a chart of color variation parameters with respect to red tones utilizing two color maps in a single-pass, bi-directional print mode as implemented in the preferred embodiment of the present invention.

The stacked area chart of FIG. 5B further demonstrates the value of applying a first color map to the left to right printing and a second color map to the right to left printing with single-pass, bi-directional printing. Each of the three variables, hue, chroma, and luminance, exhibit a minimal difference between left to right and adjacent right to left printed swaths as compared to FIG. 5A.

As described and illustrated in the figures of the preferred embodiment of the present invention, an inkjet printing system is disclosed that minimizes color hue shift between adjacent swaths or rows of printing. This inkjet printer prints in a single-pass, bidirectional mode that does not compromise print speed, printer price, or physical size to accomplish the print quality required by the inkjet printer users of today.

What is claimed is:

1. A method of printing on a print medium with a printer, the printer having a print controller and at least one printhead, the method comprising the steps of:

providing a plurality of direction dependent color maps for cooperating with said controller to help reduce color hue shifts in said print medium;

reading a first one of said plurality of color maps;

traversing the at least one printhead across the print medium in a first direction expulsing a first swath of ink droplets onto the print medium as prescribed by said first one of said plurality of color maps;

indexing the printing medium past said first swath of ink droplets;

reading a second one of said plurality of color maps;

traversing the printheads across the print medium in a second direction, opposite said first direction, expulsing a second swath, adjacent to said first swath, of ink droplets onto the print medium as prescribed by said second one of said plurality of color maps.

2. The method according to claim 1, including adjusting the quality and placement of ink droplets ejected from said printhead to minimize directional related color hue shifts on said print medium.

3. The method according to claim 1, including providing means for selecting a print mode.

4. The method according to claim 3, wherein said providing step includes means for selecting a print mode from a plurality of print modes.

5. A method of selecting a print mode for single-pass printing on a print medium in an inkjet printer, said printer including a printhead, comprising the steps of:

providing a controller;

providing a plurality of direction dependent color maps for cooperating with said controller to help reduce color hue shifts in said print medium;

selecting a predetermined print mode;

applying a first color map from sad plurality of color maps to a first printing direction;

applying a second color map from said plurality of color maps to a second printing direction, said second printing direction opposite said first printing direction, and alternating said first printing direction with said first printing direction to create a print file for printing on a medium in essentially non-overlapping print swaths.

6. The method according to claim 5, including adjusting the quality and placement of ink droplets ejected from said printhead to minimize directional related color hue shifts on said print medium.

7. The method according to claim 5, including providing means for selecting a print mode.

8. The method according to claim 7, wherein said providing step includes means for selecting a print mode from a plurality of print modes.

9. A single-pass inkjet printing system for printing on a print medium, said printer including a printhead, comprising:

a controller;

a plurality of direction dependent color maps for cooperating with said controller to help reduce color hue shifts in said print medium;

where said controller applies a first color map to a first swath for printing in a first print direction, and said controller applies a second color map to a second swath of printing for printing in a second print direction said second direction opposite said first print direction; and a printing mechanism that prints an output onto a print medium;

wherein said output is an alternating combination of said first swath and said second swath in an essentially non-overlapping manner.

10. The system according to claim 9, including means for adjusting the quality and placement of ink droplets ejected from said printhead to minimize directional related color hue shifts on said print medium.

11. The system according to claim 9, including means for selecting a print mode.

12. The system according to claim 11, including means for selecting a print mode from a plurality of print modes.

13. A single pass printer, said printer including a printhead, for printing in a first direction and a second direction on a print medium, the second direction opposite the first direction, comprising:

a plurality of direction dependent color maps and a controller wherein each one of said plurality of color maps cooperates with said controller to enable said controller to drive the printer in a print mode employing one of said plurality of color maps while depositing a first swath of ink droplets onto the print medium in the first direction, and employing another of said color maps while depositing a second swath of ink droplets, adjacent to said first swath of ink droplets, onto the print medium in the second direction whereby cooperation between each one of said plurality of color maps helps to minimize color hue shifts when said printer is printing in a single-pass, bidirectional manner.

14. The system according to claim 13, including means for adjusting the quality and placement of ink droplets ejected from said printhead to minimize directions related color hue shifts on said print medium.

15. The system according to claim 13, including means for selecting a print mode.

16. The system according to claim 13, including means for selecting a print mode from a plurality of print modes.

* * * * *